United States Patent
Pritchard

(10) Patent No.: US 8,888,658 B2
(45) Date of Patent: Nov. 18, 2014

(54) TRANSFER CASE UTILIZING AN ON-DEMAND CENTRIFUGALLY GOVERNED HYDRAULIC POWER SUPPLY TO PERFORM BOTH RANGE SHIFT AND ON-DEMAND FOUR WHEEL DRIVE

(71) Applicant: Larry A. Pritchard, Macomb, MI (US)

(72) Inventor: Larry A. Pritchard, Macomb, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 13/987,321

(22) Filed: Oct. 31, 2013

(65) Prior Publication Data

US 2014/0205468 A1    Jul. 24, 2014

Related U.S. Application Data

(60) Provisional application No. 61/720,424, filed on Oct. 31, 2012.

(51) Int. Cl.
| | |
|---|---|
| F16H 61/00 | (2006.01) |
| F16H 61/14 | (2006.01) |
| B60W 10/02 | (2006.01) |
| B60W 10/04 | (2006.01) |
| B60W 10/10 | (2012.01) |
| F04B 41/06 | (2006.01) |
| B60K 17/10 | (2006.01) |
| F04B 49/00 | (2006.01) |

(52) U.S. Cl.
CPC ............... F04B 41/06 (2013.01); B60K 17/10 (2013.01); F04B 49/002 (2013.01)
USPC ............... 477/168; 477/174; 477/36; 477/52

(58) Field of Classification Search
CPC .......... F16D 25/06; F16D 25/14; B60K 23/08
USPC ................... 477/168, 174, 36, 52, 70
See application file for complete search history.

(56) References Cited

U.S. PATENT DOCUMENTS

| | | | | |
|---|---|---|---|---|
| 6,145,644 | A * | 11/2000 | Mohan et al. | 192/103 F |
| 6,533,095 | B2 * | 3/2003 | Mohan et al. | 192/103 F |

\* cited by examiner

*Primary Examiner* — Tisha Lewis
(74) *Attorney, Agent, or Firm* — Helmholdt Law PLC; Thomas D. Helmholdt

(57) ABSTRACT

A control system (100) for an all-wheel-drive torque transfer case (102) coupling of a motor vehicle (104) including a power unit (130) having a centrifugally governed fluid pump (132) and a flow valve (134) movable between recirculation and diverter positions (134a, 134b). A control valve (136) located between the fluid pump (132), the all-wheel-drive clutch assembly (112), and the range shift assembly (120). The control valve (136) operable between a first position (136a) allowing fluid flow between the pump (132) and the clutch assembly (112), and a second position (136b) allowing fluid flow between the pump (132) and the range shift assembly (120). At least one range shift valve (138; 152, 154) located between the control valve (136) and the range shift assembly (120). The at least one range shift valve (138; 152, 154) operable between a range shift exhaust mode (138a; 136a, 152a, 154a), a high range mode (138b; 136b, 152b, 154a), a locked range mode (138c; 136a, 152b, 154b), and a low range mode (138d; 136b, 152a, 154b) of operation by selectively allowing and/or preventing pressurized fluid flow to/from the first and second expandable fluid chambers (126, 128) of the range shift assembly (120).

15 Claims, 3 Drawing Sheets

TRANSFER CASE UTILIZING AN ON-DEMAND CENTRIFUGALLY GOVERNED HYDRAULIC POWER SUPPLY TO PERFORM BOTH RANGE SHIFT AND ON-DEMAND FOUR WHEEL DRIVE

RELATED APPLICATIONS

The present application claims priority from U.S. Provisional Application Ser. No. 61/720,424 filed on Oct. 31, 2012, which is incorporated by reference herein in its entirety.

FIELD OF THE INVENTION

The invention relates to a fluid flow control system for a power transmission system of a motor vehicle, and more particularly to a transfer case having a hydraulic power supply for performing range shift and on-demand four wheel drive.

BACKGROUND

Four-wheel drive (FWD) systems for vehicles can provide increased traction for the vehicle, particularly during inclement weather conditions, or off highway conditions, as compared to that provided by conventional two-wheel drive systems. Four-wheel drive systems typically include a torque transfer case with an input shaft connected to and driven by an output shaft of a transmission, a rear output shaft connected to drive rear wheels of the vehicle, a front output shaft connected to drive front wheels of the vehicle, and a clutch mechanism for drivingly connecting the input shaft to the front and rear output shafts.

Known four-wheel drive systems can operate in either a two-wheel drive mode, a four-wheel drive mode, or an "on-demand" drive mode. Known four-wheel drive systems can provide a direct drive connection between front and rear output shafts of the transfer case when the vehicle is operated in a four-wheel drive mode. A direct drive connection does not accommodate different front and rear wheel speeds, which can occur while turning the vehicle, thus limiting this four-wheel mode of operation to a "part time" basis to address lower friction road surface conditions, such as wet or snow covered pavement, where increased traction capability is desired. The "on-demand" drive mode is provided by a clutch assembly interactively associated with an electronic control system and a sensor arrangement. When sensors detect a low traction condition at the driven wheels, the clutch assembly is automatically actuated to deliver drive torque "on-demand" to the non-driven wheels. The amount of torque transferred through the clutch assembly to the non-driven wheels can be varied as a function of specific vehicle dynamics as detected by the sensor arrangement. Four-wheel drive clutches require relatively high torque and are typically actuated using either a rotary electric motor and gear reduction system, or a plurality of pilot clutches. This type of known transfer case can be seen in U.S. Pat. No. 5,503,602; U.S. Pat. No. 5,465,820; and U.S. Pat. No. 5,462,496.

Known torque transfer cases can be equipped with a gear reduction and a synchronized range shift mechanism to permit "on-the-move" shifting between high-range and low-range drive modes. The synchronized range shift mechanism permits the vehicle operator to shift the transfer case between the high-range and low-range drive modes without stopping the vehicle. These known transfer cases can be seen in U.S. Pat. No. 7,294,086; U.S. Pat. No. 7,201,266; U.S. Pat. No. 7,059,462; U.S. Pat. No. 7,021,445; U.S. Pat. No. 6,997,299; U.S. Pat. No. 6,554,731; U.S. Pat. No. 6,458,056; U.S. Pat. No. 6,398,688; U.S. Pat. No. 6,354,977; U.S. Pat. No. 6,283,887; and U.S. Pat. No. 6,022,289.

Haldex Generation V is a commercially available electronically controllable all-wheel drive coupling or torque transfer case for motor vehicles. The Haldex Generation V includes an electronic control unit with vehicle dynamics software that can be customized to meet each vehicle maker's particular desires in terms of driving characteristics. The front and rear axle of the vehicle is connected via a wet multi-plate clutch which makes it possible to vary the torque distribution between the two axles. As the function of the Haldex Generation V is independent of the differential speed between the front and rear axle, full locking torque, if needed, is available at any given time and speed. When starting the vehicle, an electrical pump in the Haldex Generation V is started, swiftly providing the system with pressurized oil and thereby making the system ready for operation. The pump sets the pressure to a piston which in turn compresses a disc package of the wet multi-plate clutch. The level of pressure set depends on the torque level needed and on the driving situation. In traction/high slip conditions, a high pressure is delivered. In tight curves (i.e. parking) or at high speeds, a much lower pressure is provided.

Integrated into the housing of the Haldex all-wheel drive coupling, the electronic control unit (ECU) has been developed, designed and produced to endure the harsh environments to which the drivetrain is constantly subjected, including vibrations and thermal variations. The electronic control unit manages a valve which directs the torque transfer characteristics, ranging from a fully open position to a fully closed position. The open position is used during antilock braking system (ABS) operation and when stability control systems are activated. The Haldex all wheel drive (AWD) coupling opens in less the 60 milliseconds (ms). The fully closed position is used when accelerating and driving on soft ground. The software program determines the control of the coupling. The software program can include two main parts: a base software program and an application software program. The base software program can control the internal functions of the Haldex AWD coupling. One example is compensating for the variations in the viscosity of the oil due to operating temperature. The application software program can communicate with other active systems in the vehicle via a data bus. It determines the vehicle state with input signals from engine torque, engine revolutions, and wheel speeds. From this estimated vehicle state, the optimum torque distribution is determined in each condition. If any input signal is lost due to a failure in another ECU, the Haldex AWD coupling detects this and enters a limp home mode, maintaining best possible AWD function with the remaining signals. Only signal errors jeopardizing vehicle safety will result in a complete loss of AWD function (primarily front wheel drive (FWD) vehicle assumed). Every vehicle has its own requirement specification profile. This specification leads to different calibrations of the Haldex AWD coupling. A multiple set of parameters are available in the software itself. Online, the application software program can determine which set to use in the actual vehicle (e.g., family vs. sports sedan).

SUMMARY

Present transfer cases use a multiplicity of devices (electric motors and electromagnetic clutches) to effect the actuation of different ranges (L-N-H) and to perform on demand four wheel drive clutch actuation. The present invention seeks to use one prime mover to effect both range selection and clutch actuation. The prime mover selected is a Gen V hydraulic power pack with a centrifugally operated diverter valve to channel hydraulic power from recirculation to actuation. Once the fluid is available for actuation there exists a valve to divert the fluid flow to either range actuation or clutch actuation. Additionally, there is at least one more valve that selects either a low range, a neutral range, or a high range when the range actuation circuit is selected. In order to aide in functionality and maintain a clean non-aerated oil supply to the hydraulics, the hydraulic fluid flow circuit is separated from the main transfer case sump. This allows all of the contaminated and aerated oil to be used for transfer case lube and clutch cooling while the hydraulic actuation system remains intact.

A fluid flow control system for an all-wheel-drive torque transfer case coupling for a motor vehicle includes a fluid pressure actuated on-demand all-wheel-drive clutch assembly having a spring biasing a piston to define a single expandable working fluid chamber and a fluid pressure actuated range shift assembly having a reciprocal member enclosed within a housing to define first and second expandable working fluid chambers. A power unit can have a centrifugal fluid pump and a flow valve movable between a recirculation position and a diverter position. A control valve can be located between the fluid pump, the clutch assembly, and the range shift assembly. The control valve can be operable between a first position allowing fluid flow between the pump and the clutch assembly, and a second position allowing fluid flow between the pump and the range shift assembly. A range shift valve assembly can be located between the control valve and the range shift assembly. The range shift valve assembly can be operable between an exhaust mode of operation allowing fluid flow between the first and second expandable working fluid chambers and a fluid sump while preventing fluid flow between the control valve and the range shift assembly, a high range mode of operation allowing fluid flow between the control valve and the first expandable working fluid chamber while permitting fluid flow between the second expandable chamber and the fluid sump, a locked range mode of operation preventing fluid flow between the control valve and the range shift assembly and preventing fluid flow between the first and second expandable working fluid chambers and the fluid sump, and a low range mode of operation allowing fluid flow between the control valve and the second expandable working fluid chamber while permitting fluid flow between the first expandable working fluid chamber and the fluid sump.

A fluid flow control system for an all-wheel-drive torque transfer case coupling of a motor vehicle can include a fluid pressure actuated on-demand all-wheel-drive clutch assembly having a spring biased piston to define a single expandable working fluid chamber. A fluid pressure actuated range shift assembly can have a reciprocal member enclosed within a housing to define first and second expandable working fluid chambers. A power unit can have a centrifugal fluid pump and a flow valve movable between a recirculation position and a diverter position. A control valve can be located between the fluid pump, the clutch assembly, and the range shift assembly. The control valve can be operable between a first position allowing fluid flow between the pump and the clutch assembly, and a second position allowing fluid flow between the pump and the range shift assembly. At least one range shift valve can be located between the control valve and the range shift assembly. The at least one range shift valve can be operable between a first mode allowing fluid flow between the first and second expandable working fluid chambers and a fluid sump while preventing fluid flow between the control valve and the range shift assembly, a second mode allowing fluid flow between the control valve and the first expandable working fluid chamber while permitting fluid flow between the second expandable chamber and the fluid sump, a third mode preventing fluid flow between the control valve and the range shift assembly and preventing fluid flow between the first and second expandable working fluid chambers and the fluid sump, and a fourth mode allowing fluid flow between the control valve and the second expandable working fluid chamber while permitting fluid flow between the first expandable working fluid chamber and the fluid sump.

A method of controlling an all-wheel-drive torque transfer case coupling of a motor vehicle can include providing a fluid pressure actuated on-demand all-wheel-drive clutch assembly having a spring biased piston to define a single expandable working fluid chamber. A fluid pressure actuated range shift assembly can be provided having a reciprocal member enclosed within a housing to define first and second expandable working fluid chambers. A flow valve located within a power unit having a centrifugal fluid pump can be moved between a recirculation position and a diverter position. A control valve located between the fluid pump, the clutch assembly, and the range shift assembly, can be operated between a first position allowing fluid flow between the pump and the clutch assembly, and a second position allowing fluid flow between the pump and the range shift assembly. A at least one range shift valve located between the control valve and the range shift assembly, can be operated between a range shift exhaust mode allowing fluid flow between the first and second expandable working fluid chambers and a fluid sump while preventing fluid flow between the control valve and the range shift assembly, a high range mode allowing fluid flow between the control valve and the first expandable working fluid chamber while permitting fluid flow between the second expandable chamber and the fluid sump, a locked range mode preventing fluid flow between the control valve and the range shift assembly and preventing fluid flow between the first and second expandable working fluid chambers and the fluid sump, and a low range mode allowing fluid flow between the control valve and the second expandable working fluid chamber while permitting fluid flow between the first expandable working fluid chamber and the fluid sump.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 3:
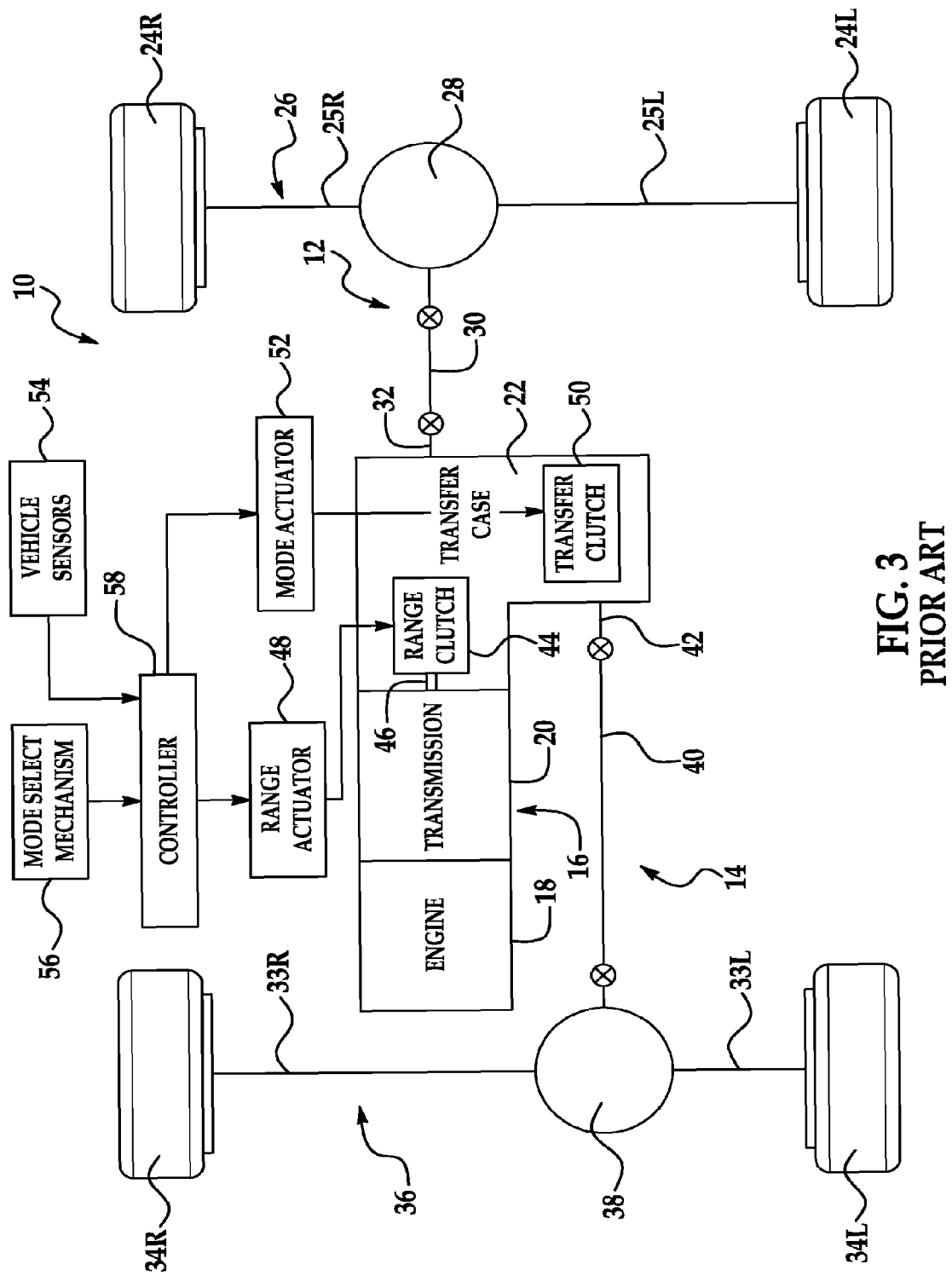
FIG. 3 is a schematic view of a motor vehicle including an engine and a transmission connected to a torque transfer case for driving front and rear wheels, where the transfer case includes a transfer clutch and a range clutch actuated by a controller responsive to vehicle sensors and/or vehicle operator input.

Referring first to FIG. 3, a known drivetrain 10 for a four-wheel drive vehicle is shown. Drivetrain 10 includes a first driveline 12, a second driveline 14 and a powertrain 16 for delivering rotary drive torque to the first and second drivelines 12, 14. By way of example and not limitation, in the particular arrangement shown, first driveline 12 can be a rear driveline while second driveline 14 can be a front driveline. Powertrain 16 can include an engine 18, a multispeed transmission 20, and a power transmission device, sometimes referred to hereinafter as a transfer case 22. Rear driveline 12 can include a pair of rear wheels 24L and 24R connected at opposite ends of axle shafts 25L and 25R associated with a rear axle assembly 26 which also includes a rear differential 28. A rear drive shaft 30 can interconnect a rear differential 28 to a rear output shaft 32 of transfer case 22. Similarly, front driveline 14 can include a pair of front wheels 34L and 34R connected at opposite ends of axle shafts 33L and 33R associated with a front axle assembly 36 which also includes a front differential unit 38. A front drive shaft 40 can interconnect a front differential 38 to a front output shaft 42 of transfer case 22.

Drivetrain 10 is shown to further include a power transfer system for permitting a vehicle operator to select between a two-wheel drive mode, a part-time four-wheel high-range drive mode, an on-demand four-wheel high-range drive mode, a neutral non-driven mode, and a part-time four-wheel low-range drive mode. In this regard, transfer case 22 is equipped with a range clutch 44 that is operable for establishing the high-range and low-range drive connections between an input shaft 46 and rear output shaft 32, and a range actuator 48 that is operable for actuating range clutch 44. Transfer case 22 also includes a transfer clutch 50 that is operable for transferring drive torque from rear output shaft 32 to front output shaft 42 for establishing the part-time and on-demand four-wheel drive modes. The power transfer system further includes a hydraulically-operated clutch actuator 52 for actuating transfer clutch 50, vehicle sensors 54 for detecting certain dynamic and operational characteristics of the motor vehicle, a mode select mechanism 56 for permitting the vehicle operator to select one of the available drive modes and a controller 58 for controlling actuation of range actuator 48 and clutch actuator 52 in response to input signals from vehicle sensors 54 and mode select mechanism 56.

Figure 1:
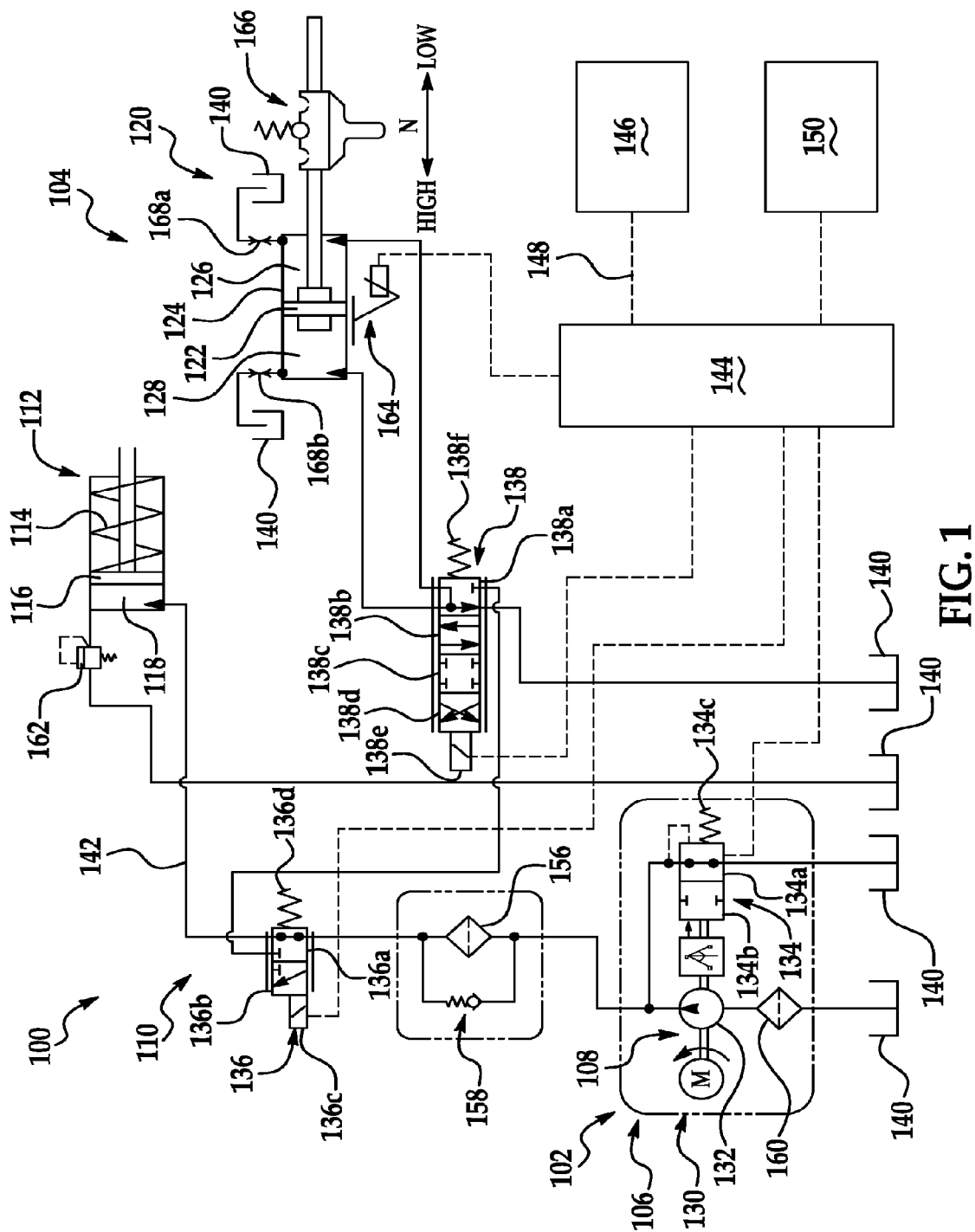
FIG. 1 is a schematic view of a fluid flow control system for a power transmission system of a motor vehicle including a transfer case having a hydraulic power supply for performing range shift and on-demand four wheel drive with a hydraulic actuation system for diverting fluid flow to perform either a range actuation or a clutch actuation.

Referring now to FIG. 1, a fluid flow control system 100 for a power transmission system 102 of a motor vehicle 104 is schematically illustrated including a transfer case 106 having a centrifugally governed hydraulic power supply 108 for performing range shift and on-demand four wheel drive with a hydraulic actuation system 110 for diverting fluid flow to perform either a range actuation or a clutch actuation. The fluid flow control system 100 for an all-wheel-drive torque transfer case 106 coupling of a motor vehicle can include a fluid pressure actuated on-demand all-wheel-drive clutch assembly 112 having a spring 114 biasing a piston 116 to define a single expandable working fluid chamber 118 and a fluid pressure actuated range shift assembly 120 having a reciprocal member 122 enclosed within a housing 124 to define first and second expandable working fluid chambers 126, 128 for shifting between high, neutral, and low gear settings.

A power unit 130, such as a commercially available Haldex Generation V power unit, has a centrifugally governed fluid pump 132. A flow valve 134 can be added to the recirculation line of the commercially available power unit 130 for movement between a recirculation position 134a and a diverter position 134b. When in the recirculation position 134a, fluid flow from the centrifugal fluid pump 132 flows to a fluid sump 140. When in the diverter position 134b, fluid flow from the centrifugal fluid pump 132 flows to a control valve 136.

The control valve 136 can be located between the fluid pump 132, the clutch assembly 112, and the range shift assembly 120. The control valve 136 can be operable between first and second positions 136a, 136b. The first position 136a allows fluid flow between the fluid pump 132 and the clutch assembly 112. When the flow valve 134 is in the recirculation position 134a and the control valve 136 is in the first position 136a, the biasing spring 114 drives the piston 112 to contract the single expandable working fluid chamber 116 causing fluid to flow from the on-demand all-wheel-drive clutch 112 through passage 142 to the power unit 130. When the flow valve 134 is in the diverter position 134b and the control valve 136 is in the first position 136a, the fluid pressure overcomes the force of biasing spring 114 and drives the piston 112 to expand the single expandable working fluid chamber 116 causing fluid to flow from the fluid pump 132 of the power unit 130 to the on-demand all-wheel-drive clutch 112 through passage 142. The second position 136b of the control valve 136 allows fluid flow between the pump 132 and the range shift assembly 120.

A range shift valve assembly 138 can be located between the control valve 136 and the range shift assembly 120. The range shift valve assembly 138 can be operable between an exhaust mode 138a of operation, a high range mode 138b of operation, a locked range mode 138c of operation, and a low range mode 138d of operation. The exhaust mode 138a of operation allows fluid flow between the first and second expandable working fluid chambers 126, 128 and a fluid sump 140, while preventing fluid flow between the control valve 136 and the range shift assembly 120. The high range mode 138b of operation allows fluid flow between the control valve 136 and the first expandable working fluid chamber 126 while permitting fluid flow between the second expandable chamber 128 and the fluid sump 140, a locked range mode 138c of operation preventing fluid flow between the control valve 136 and the range shift assembly 120 and preventing fluid flow between the first and second expandable working fluid chambers 126, 128 and the fluid sump 140, and a low range mode 138d of operation allowing fluid flow between the control valve 136 and the second expandable working fluid chamber 128 while permitting fluid flow between the first expandable working fluid chamber 126 and the fluid sump 140.

A single fluid passage 142 can extend between the control valve 136 and the clutch assembly 112 allowing expansion and contraction of the single expandable working fluid chamber 118 in response to movement of the flow valve of the power unit 130 between the recirculation position 134a and the diverter position 134b. The torque transfer case 102 can include an electronic control unit 144 having software controlling internal functions of the all-wheel-drive clutch assembly 112 and communicating with sensors 146 in the motor vehicle 104 via a data bus 148. The all-wheel-drive clutch assembly 112 can include a wet multi-plate clutch 50 for selectively connecting the input shaft 46 to the first and second output shafts 32, 42. The range shift assembly 120 can include a manually operated switch 150 within a passenger compartment of the motor vehicle 104 for triggering movement of the control valve 136 and the range shift valve assembly 138 to perform a range shift function while the motor vehicle 104 is stopped and a transmission 20 of the motor vehicle 104 is in neutral. Control signals can be responsive to vehicle sensors 148, by way of example and not limitation, such as wheel slip, throttle angle, etc., for triggering movement of the flow valve 134 of the power unit 130 between the recirculation position 134a and the diverter position 134b.

The fluid flow control system 100 can also include a filter 156 with bypass 158 located between the pump 132 and the control valve 136. The control valve 136 can be operated by an actuator 136c and biased by a spring 136d toward position 136a corresponding to fluid communication between fluid pump 132 and the on-demand all-wheel-drive clutch assembly 112. The on-demand all-wheel-drive assembly 112 can include a pressure relief valve 162, by way of example and not limitation, set at predetermined value such as 40 bar. The power unit 130 can also include a filter 160 and a spring 134c for biasing the flow valve 134 toward the recirculation position 134a. The range shift valve assembly 138 can be operated by an actuator 138e and biased by a spring 138f toward position 138a allowing fluid flow between the first and second expandable working fluid chambers 126, 128 of the range shift assembly 120 and a fluid sump 140, while preventing fluid flow between the control valve 136 and the range shift assembly 120. The range shift assembly 120 can include a position sensor 164 and a detent assembly 166. The position sensor 164 at the range shift rail provides feedback on whether a range selection was successful. Current range shift systems store up shift energy in a spring in the case of a blocked shift, and the fork will spring into position once the block is overcome. With the position sensor 164 and feedback signal as illustrated, a shift will be re-attempted by the electronic control unit 144 if a blocked shift is detected. As best seen in FIG. 1, air bleed valves 168a, 168b can be provided for the first and second expandable working fluid chambers 126, 128 of the range shift assembly 120.

Figure 2:
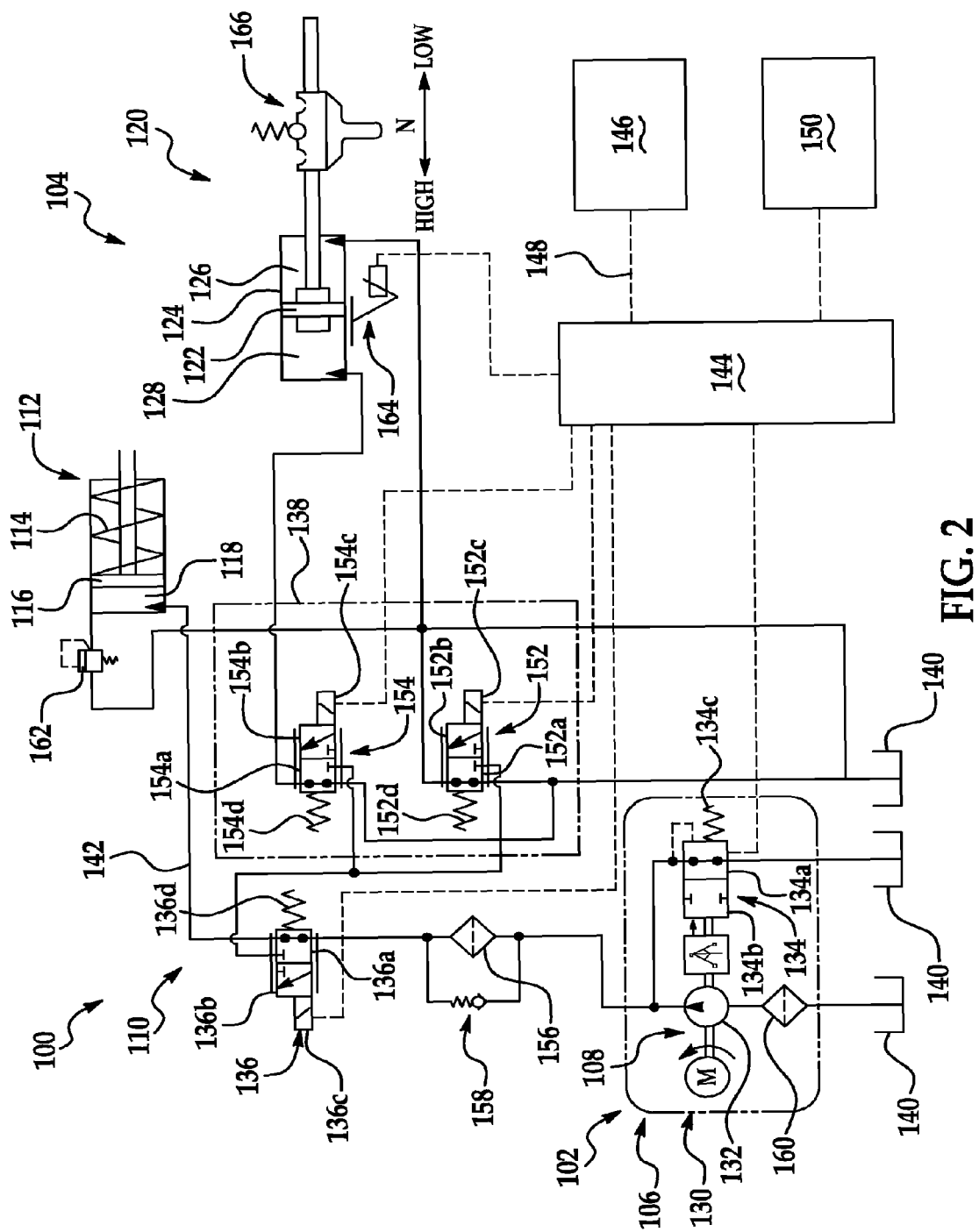
FIG. 2 is a schematic view of an alternative hydraulic actuation system for diverting fluid flow to perform either a range actuation or a clutch actuation.

As best seen in FIG. 2, an alternative arrangement of the range shift valve assembly 138 can include a first range shift control valve 152 and a second range shift control valve 154. The first range shift control valve 152 can be operated by an actuator 152c and biased by a spring 152d toward position 152a corresponding to fluid communication between first expandable working fluid chamber 126 and the fluid sump 140, while preventing fluid communication between the control valve 136 and the range shift assembly 120. The second range shift control valve 154 can be operated by an actuator 154c and biased by a spring 154d toward position 154a corresponding to fluid communication between second expandable working fluid chamber 128 and the fluid sump 140, while preventing fluid communication between the control valve 136 and the range shift assembly 120.

According to FIG. 2, a fluid flow control system 100 for an all-wheel-drive torque transfer case 102 coupling of a motor vehicle 104 can include a fluid pressure actuated on-demand all-wheel-drive clutch assembly 112 having a spring 114 biased piston 116 to define a single expandable working fluid chamber 118. A fluid pressure actuated range shift assembly 120 can have a reciprocal member 122 enclosed within a housing 124 to define first and second expandable working fluid chambers 126, 128. A power unit 130 can have a centrifugally governed fluid pump 132 and a flow valve 134 movable between a recirculation position 134a and a diverter position 134b. A control valve 136 can be located between the fluid pump 134, the clutch assembly 112, and the range shift assembly 120. The control valve 136 can be operable between a first position 136a allowing fluid flow between the pump 132 and the clutch assembly 112, and a second position 136b allowing fluid flow between the pump 132 and the range shift assembly 120. At least one range shift valve 138, by way of example and not limitation, such as range shift valve 138 best seen in FIG. 1 or first and second range shift valves 152, 154 best seen in FIG. 2, can be located between the control valve 136 and the range shift assembly 120. The at least one range shift valve 138 or 152, 154 can be operable between first, second, third and fourth modes of operation.

When in the first mode of operation as illustrated in FIG. 2, the control valve 136 is in the first position 136a, and the first and second range shift control valves 152, 154 are in the first positions 152a, 154a respectively, allowing fluid flow between the first and second expandable working fluid chambers 126, 128 and a fluid sump 140, while preventing fluid flow between the control valve 136 and the range shift assembly 112. When in the second mode of operation as illustrated in FIG. 2, the control valve 136 is in the second position 136b, and the first and second range shift valves 152, 154 are in the second and first positions 152b, 154a respectively, allowing fluid flow between the control valve 136 and the first expandable working fluid chamber 126, while permitting fluid flow between the second expandable chamber 128 and the fluid sump 140. When in the third mode of operation as illustrated in FIG. 2, the control valve 136 is in the first position 136a, and the first and second range shift valves 152, 154 are in the second and second positions 152b, 154b respectively, preventing fluid flow between the control valve 136 and the range shift assembly 120, while also preventing fluid flow between the first and second expandable working fluid chambers 126, 128 and the fluid sump 140. When in the fourth mode of operation as illustrated in FIG. 2, the control valve 136 is in the second position 136b, and the first and second range shift valves 152, 154 are in the first and second positions 152a, 154b respectively, allowing fluid flow between the control valve 136 and the second expandable working fluid chamber 128, while permitting fluid flow between the first expandable working fluid chamber 126 and the fluid sump 140. The second mode of operation drives the range shift assembly 120 to the left as illustrated toward the high range. The fourth mode of operation drives the range shift assembly 120 to the right as illustrated in FIG. 2 toward the low range.

A single fluid passage 142 between the control valve 136 and the clutch assembly 112 allows expansion and contraction of the single expandable working fluid chamber 118 in response to movement of the flow valve 134 of the power unit 130 between the recirculation position 134a and the diverter position 134b. When the flow valve 134 is in the recirculation position 134a and the control valve 136 is in the first position 136a, the biasing spring 114 drives the piston 112 to contract the single expandable working fluid chamber 116 causing fluid to flow from the on-demand all-wheel-drive clutch 112 through passage 142 to the power unit 130. When the flow valve 134 is in the diverter position 134b and the control valve 136 is in the first position 136a, the fluid pressure overcomes the force of biasing spring 114 and drives the piston 112 to expand the single expandable working fluid chamber 116 causing fluid to flow from the fluid pump 132 of the power unit 130 to the on-demand all-wheel-drive clutch 112 through passage 142.

An electronic control unit 144 operated according to a software program controls internal functions of the on-demand all-wheel-drive clutch assembly 112 in response to communication with sensors 146 in the motor vehicle 102 via a data bus 148. Control signals can be responsive to vehicle sensors 146, by way of example and not limitation, such as wheel slip, throttle angle, etc., for triggering movement of the flow valve 134 of the power unit 130 between the recirculation position 134a and the diverter position 134b. The on-demand all-wheel-drive assembly 112 can include a wet multi-plate clutch 50 for selectively connecting the input shaft 46 to the first and second output shafts 32, 42. A manually operated switch 150 located within a passenger compartment of the motor vehicle 104 can trigger movement of the control valve 136 and the at least one range shift valve 152, 154 to perform a range shift function while the motor vehicle 104 is stopped and a transmission 20 of the motor vehicle 104 is in neutral.

In summary, a method of controlling an all-wheel-drive torque transfer case 102 coupling of a motor vehicle 104 can include providing a fluid pressure actuated on-demand all-wheel-drive clutch assembly 112 having a spring 114 biased piston 116 to define a single expandable working fluid chamber 118. The method also provides a fluid pressure actuated range shift assembly 120 having a reciprocal member 122 enclosed within a housing 124 to define first and second expandable working fluid chambers 126, 128. A flow valve 134 is moved within a power unit 130 having a centrifugally governed fluid pump 132 between a recirculation position 134a and a diverter position 134b. A control valve 136 located between the fluid pump 132, the all-wheel-drive clutch assembly 112, and the range shift assembly 120, is operated between a first position 136a allowing fluid flow between the pump 132 and the all-wheel-drive clutch assembly 112, and a second position 136b allowing fluid flow between the pump 132 and the range shift assembly 120.

At least one range shift valve 138 as illustrated in FIG. 1, or valves 152, 154 as illustrated in FIG. 2, can be located between the control valve 136 and the range shift assembly 120. The at least one range shift valve is operated between a range shift exhaust mode, high range mode, locked range mode, and low range mode of operation. The exhaust mode of operation corresponds to position 138a of range shift valve 138 as illustrated in FIG. 1, or the combination of position 136a of control valve 136 and positions 152a, 154a of the first and second range shift valves 152, 154 as illustrated in FIG. 2, allowing fluid flow between the first and second expandable working fluid chambers 126, 128 and a fluid sump 140, while preventing fluid flow between the control valve 136 and the range shift assembly 120. A high range mode of operation corresponds to position 138b of range shift valve 138 as illustrated in FIG. 1, or the combination of position 136b of control valve 136 and positions 152b, 154a of first and second range shift valves 152, 154 as illustrated in FIG. 2, allowing fluid flow between the control valve 136 and the first expandable working fluid chamber 126, while permitting fluid flow between the second expandable chamber 128 and the fluid sump 140. A locked range mode of operation corresponds to position 138c of range shift valve 138 as illustrated in FIG. 1, or the combination of position 136a of control valve 136 and positions 152b, 154b of first and second range shift valves 152, 154 as illustrated in FIG. 2, preventing fluid flow between the control valve 136 and the range shift assembly 120, and preventing fluid flow between the first and second expandable working fluid chambers 126, 128 and the fluid sump 140. A low range mode of operation corresponds to position 138d of range shift valve 138 as illustrated in FIG. 1, or the combination of position 136b of control valve 136 and positions 152a, 154b of the first and second range shift valves 152, 154 as illustrated in FIG. 2, allowing fluid flow between the control valve 136 and the second expandable working fluid chamber 128, while permitting fluid flow between the first expandable working fluid chamber 126 and the fluid sump 140.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In a fluid flow control system (100) for an all-wheel-drive torque transfer case (102) coupling for a motor vehicle (104), the improvement comprising:
    a fluid pressure actuated on-demand all-wheel-drive clutch assembly (112) having a spring (114) biasing a piston (116) to define a single expandable working fluid chamber (118);
    a fluid pressure actuated range shift assembly (120) having a reciprocal member (122) enclosed within a housing (124) to define first and second expandable working fluid chambers (126, 128):
    a power unit (130) having a centrifugal fluid pump (132) and a flow valve (134) movable between a recirculation position (134a) and a diverter position (134b);
    a control valve (136) located between the fluid pump (132), the clutch assembly (112), and the range shift assembly (120), the control valve (136) operable between a first position (136a) allowing fluid flow between the pump (132) and the clutch assembly (112), and a second position (136b) allowing fluid flow between the pump (132) and the range shift assembly (120); and
    a range shift valve assembly (138) located between the control valve (136) and the range shift assembly (120), the range shift valve assembly (120) operable between an exhaust mode (138a) of operation allowing fluid flow between the first and second expandable working fluid chambers (126, 128) and a fluid sump (140) while preventing fluid flow between the control valve (136) and the range shift assembly (112), a high range mode (138b) of operation allowing fluid flow between the control valve (136) and the first expandable working fluid chamber (126) while permitting fluid flow between the second expandable chamber (128) and the fluid sump (140), a locked range mode (138c) of operation preventing fluid flow between the control valve (136) and the range shift assembly (112) and preventing fluid flow between the first and second expandable working fluid chambers (126, 128) and the fluid sump (140), and a low range mode (138d) of operation allowing fluid flow between the control valve (136) and the second expandable working fluid chamber (128) while permitting fluid flow between the first expandable working fluid chamber (126) and the fluid sump (140).

2. The fluid flow control system (100) of claim 1 further comprising:
    a single fluid passage (142) between the control valve (136) and the clutch assembly (112) allowing expansion and contraction of the single expandable working fluid chamber (116) in response to movement of the flow valve of the power unit (130) between the recirculation position (134a) and the diverter position (134b).

3. The fluid flow control system (100) of claim 1, wherein the torque transfer case (102) coupling further comprises:
    an electronic control unit (144) having software controlling internal functions of the all-wheel-drive clutch assembly (112) and communicating with sensors (146) in the motor vehicle (104) via a data bus (148).

4. The fluid flow control system (100) of claim 1, wherein the torque transfer case (102) coupling further comprises:

an input shaft (46); and
first and second output shafts (32, 42).

5. The fluid flow control system (100) of claim 4, wherein the all-wheel-drive clutch assembly (112) further comprises:
a wet multi-plate clutch (50) for selectively connecting the input shaft (46) to the first and second output shafts (32, 42).

6. The fluid flow control system (100) of claim 1, wherein the range shift assembly (120) further comprises:
a manually operated switch (150) within a passenger compartment of the motor vehicle (104) for triggering movement of the control valve (136) and the range shift valve assembly (138) to perform a range shift function while the motor vehicle (104) is stopped and a transmission (20) of the motor vehicle (104) is in neutral.

7. The fluid flow control system (100) of claim 1 further comprising:
control signals responsive to vehicle sensors (148 wheel slip, throttle angle) for triggering movement of the flow valve (134) of the power unit (130) between the recirculation position (134a) and the diverter position (134b).

8. A fluid flow control system (100) for an all-wheel-drive torque transfer case (102) coupling of a motor vehicle (104) comprising:
a fluid pressure actuated on-demand all-wheel-drive clutch assembly (112) having a spring (114) biased piston (116) to define a single expandable working fluid chamber (118);
a fluid pressure actuated range shift assembly (120) having a reciprocal member (122) enclosed within a housing (124) to define first and second expandable working fluid chambers (126, 128);
a power unit (130) having a centrifugally governed fluid pump (132) and a flow valve (134) movable between a recirculation position (134a) and a diverter position (134b);
a control valve (136) located between the fluid pump (134), the clutch assembly (112), and the range shift assembly (120), the control valve (136) operable between a first position (136a) allowing fluid flow between the pump (132) and the clutch assembly (112), and a second position (136b) allowing fluid flow between the pump (132) and the range shift assembly (120); and
at least one range shift valve (138; 152, 154) located between the control valve (136) and the range shift assembly (120), the at least one range shift valve (138; 152, 154) operable between a first mode (138a; 136a, 152a, 154a) allowing fluid flow between the first and second expandable working fluid chambers (126, 128) and a fluid sump (140) while preventing fluid flow between the control valve (136) and the range shift assembly (112), a second mode (138b; 136b, 152b, 154a) allowing fluid flow between the control valve (136) and the first expandable working fluid chamber (126) while permitting fluid flow between the second expandable chamber (128) and the fluid sump (140), a third mode (138c; 136a, 152b, 154b) preventing fluid flow between the control valve (136) and the range shift assembly (120) and preventing fluid flow between the first and second expandable working fluid chambers (126, 128) and the fluid sump (140), and a fourth mode (138d; 136b, 152a, 154b) allowing fluid flow between the control valve (136) and the second expandable working fluid chamber (128) while permitting fluid flow between the first expandable working fluid chamber (126) and the fluid sump (140).

9. The fluid flow control system (100) of claim 8 further comprising:
a single fluid passage (142) between the control valve (136) and the clutch assembly (112) allowing expansion and contraction of the single expandable working fluid chamber (118) in response to movement of the flow valve (134) of the power unit (130) between the recirculation position (134a) and the diverter position (134b).

10. The fluid flow control system (100) of claim 8, wherein the torque transfer case (102) coupling further comprises:
an electronic control unit (144) having software controlling internal functions of the all-wheel-drive clutch assembly (112) and communicating with sensors (146) in the motor vehicle (102) via a data bus (148).

11. The fluid flow control system (100) of claim 8, wherein the torque transfer case (102) coupling further comprises:
an input shaft (46); and
first and second output shafts (32, 42).

12. The fluid flow control system (100) of claim 11, wherein the all-wheel-drive clutch assembly (112) further comprises:
a wet multi-plate clutch (50) for selectively connecting the input shaft (46) to the first and second output shafts (32, 42).

13. The fluid flow control system (100) of claim 8, wherein the range shift assembly (120) further comprises:
a manually operated switch (150) within a passenger compartment of the motor vehicle (104) for triggering movement of the control valve (136) and the at least one range shift valve (152, 154) to perform a range shift function while the motor vehicle (104) is stopped and a transmission (20) of the motor vehicle (104) is in neutral.

14. The fluid flow control system (100) of claim 8 further comprising:
control signals responsive to vehicle sensors (146 wheel slip, throttle angle) for triggering movement of the flow valve (134) of the power unit (130) between the recirculation position (134a) and the diverter position (134b).

15. A method of controlling an all-wheel-drive torque transfer case (102) coupling of a motor vehicle (104) comprising:
providing a fluid pressure actuated on-demand all-wheel-drive clutch assembly (112) having a spring (114) biased piston (116) to define a single expandable working fluid chamber (118);
providing a fluid pressure actuated range shift assembly (120) having a reciprocal member (122) enclosed within a housing (124) to define first and second expandable working fluid chambers (126, 128);
moving a flow valve (134) within a power unit (130) having a centrifugally governed fluid pump (132) between a recirculation position (134a) and a diverter position (134b);
operating a control valve (136) located between the fluid pump (132), the all-wheel-drive clutch assembly (112), and the range shift assembly (120), between a first position (136a) allowing fluid flow between the pump (132) and the all-wheel-drive clutch assembly (112), and a second position (136b) allowing fluid flow between the pump (132) and the range shift assembly (120); and
operating at least one range shift valve (138; 152, 154) located between the control valve (136) and the range shift assembly (120), between a range shift exhaust mode (138a; 136a, 152a, 154a) allowing fluid flow between the first and second expandable working fluid chambers (126, 128) and a fluid sump (140) while preventing fluid flow between the control valve (136) and the range shift assembly (120), a high range mode (138*b*; 136*b*, 152*b*, 154*a*) allowing fluid flow between the control valve (136) and the first expandable working fluid chamber (126) while permitting fluid flow between the second expandable chamber (128) and the fluid sump (140), a locked range mode (138*c*; 136*a*, 152*b*, 154*b*) preventing fluid flow between the control valve (136) and the range shift assembly (120) and preventing fluid flow between the first and second expandable working fluid chambers (126, 128) and the fluid sump (140), and a low range mode (138*d*; 136*b*, 152*a*, 154*b*) allowing fluid flow between the control valve (136) and the second expandable working fluid chamber (128) while permitting fluid flow between the first expandable working fluid chamber (126) and the fluid sump (140).

\* \* \* \* \*